United States Patent
Greiner et al.

(10) Patent No.: US 8,082,979 B2
(45) Date of Patent: Dec. 27, 2011

(54) SYSTEM AND METHOD FOR ENVIRONMENTAL MANAGEMENT OF A VEHICLE

(75) Inventors: Christopher Greiner, Birmingham, MI (US); Gerhard Dage, Franklin, MI (US); Halim Wijaya, Canton, MI (US); Wayne Buescher, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1212 days.

(21) Appl. No.: 11/668,723

(22) Filed: Jan. 30, 2007

(65) Prior Publication Data

US 2008/0183334 A1 Jul. 31, 2008

(51) Int. Cl.
*B60H 1/00* (2006.01)
*F24F 7/00* (2006.01)

(52) U.S. Cl. .............. 165/202; 165/204; 236/49.3

(58) Field of Classification Search .......... 165/202, 165/203, 204; 236/49.3
See application file for complete search history.

(56) References Cited

U.S. PATENT DOCUMENTS

| | | | |
|---|---|---|---|
| 3,421,576 A * | 1/1969 | Roane ............ | 165/202 |
| 4,408,660 A * | 10/1983 | Sutoh et al. ........ | 165/202 |
| 4,783,970 A | 11/1988 | Takahashi | |
| 4,895,000 A | 1/1990 | Takahashi | |
| 5,275,012 A | 1/1994 | Dage et al. | |
| 6,073,456 A | 6/2000 | Kawai et al. | |
| 6,112,807 A | 9/2000 | Dage | |
| 6,330,909 B1 | 12/2001 | Takahashi et al. | |
| 6,454,178 B1 * | 9/2002 | Fusco et al. ........ | 165/203 |
| 6,481,222 B1 | 11/2002 | Denniston | |
| 6,508,408 B2 | 1/2003 | Kelly et al. | |
| 6,516,621 B2 | 2/2003 | Homan et al. | |
| 6,616,057 B1 * | 9/2003 | Kelly et al. ........ | 236/49.3 |
| 6,627,851 B2 * | 9/2003 | Sangwan et al. ..... | 219/203 |
| 6,644,558 B2 * | 11/2003 | Ohga et al. ........ | 236/49.3 |
| 6,668,917 B1 | 12/2003 | Zeng | |
| 6,675,597 B2 | 1/2004 | Ieda et al. | |
| 6,698,663 B2 * | 3/2004 | Wang et al. ........ | 236/49.3 |
| 7,032,393 B2 | 4/2006 | Tamai et al. | |
| 7,681,630 B2 * | 3/2010 | Klassen et al. ....... | 165/202 |
| 7,832,221 B2 * | 11/2010 | Wijaya et al. ...... | 62/133 |
| 2008/0093132 A1 * | 4/2008 | Wijaya et al. ...... | 180/53.8 |
| 2010/0274394 A1 * | 10/2010 | Wijaya et al. ...... | 180/65.21 |
| 2010/0286830 A1 * | 11/2010 | Wijaya et al. ...... | 180/65.21 |

FOREIGN PATENT DOCUMENTS

JP 62253515 11/1987

* cited by examiner

*Primary Examiner* — Ljiljana Ciric
(74) *Attorney, Agent, or Firm* — David B. Kelley; Brooks Kushman P.C.

(57) ABSTRACT

A method for environmental management of a vehicle includes the steps of determining certain environmental conditions for the vehicle, and determining when it is desirable to defog the window based on the determined environmental conditions. A status of manual overrides is determined, and at least some automatically controllable functions of an HVAC system are implemented to effect defogging of a vehicle window when it is determined that none of the manual overrides has been selected.

24 Claims, 3 Drawing Sheets

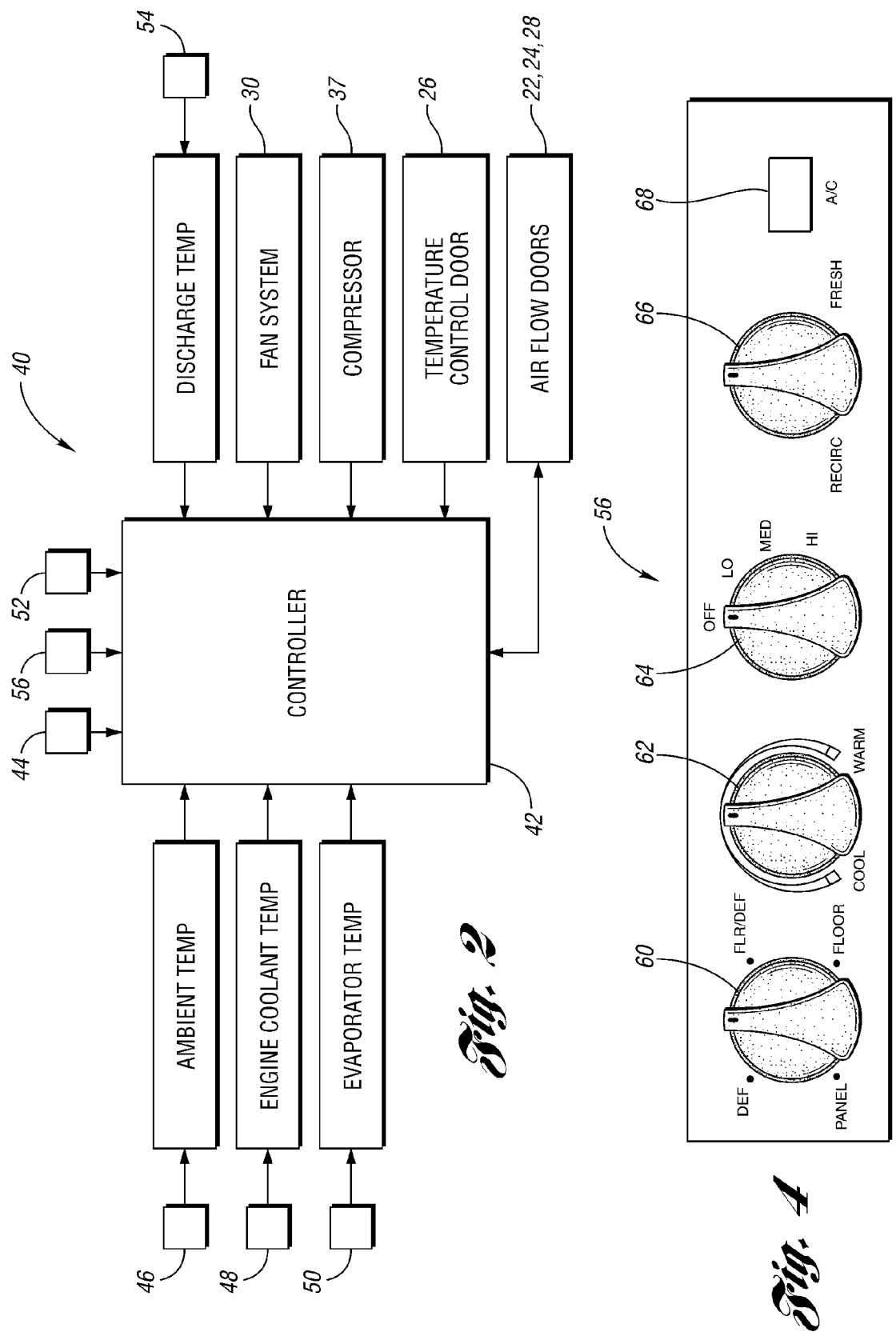

| | MANUAL OVERRIDE | | | RESULT |
|---|---|---|---|---|
| OPT# | STATE | FAN | A/C OFF | REC | AUTO DEFOG ACTIONS |
| 1 | 1 | NO | NO | NO | YES |
| | 2 | YES | ANY | ANY | NONE |
| | 3 | NO | ANY | ANY | NONE |
| | 4 | ANY | YES | ANY | NONE |
| | 5 | ANY | NO | ANY | NONE |
| | 6 | ANY | ANY | YES | NONE |
| | 7 | ANY | ANY | NO | NONE |
| 2 | 1 | NO | NO | NO | YES |
| | 2 | ANY | YES | NO | NONE |
| | 3 | ANY | NO | YES | NONE |
| | 4 | YES | NO | NO | YES-LTD. FAN |
| 3 | 1 | NO | NO | NO | YES |
| | 2 | YES | NO | NO | YES-LTD. A/C |
| | 3 | NO | YES | NO | YES-LTD. FAN, A/C |
| | 4 | YES | YES | NO | YES-LTD. A/C |
| | 5 | NO | NO | YES | YES-LTD. FAN, A/C |
| | 6 | YES | NO | YES | YES-LTD. A/C |
| | 7 | NO | YES | YES | YES-LTD. FAN, A/C |
| | 8 | YES | YES | YES | YES-LTD. A/C |
| 4 | 1 | NO | NO | NO | YES |
| | 2 | YES | NO | NO | YES-LTD. FNC'S |
| | 3 | NO | YES | NO | YES-LTD. FNC'S |
| | 4 | YES | YES | NO | YES-LTD. FNC'S |
| | 5 | NO | NO | YES | NONE |
| | 6 | YES | NO | YES | NONE |
| | 7 | NO | YES | YES | NONE |
| | 8 | YES | YES | YES | NONE |
| 5 | 1 | NO | NO | NO | YES |
| | 2 | YES | NO | NO | YES |
| | 3 | NO | YES | NO | YES |
| | 4 | YES | YES | NO | YES |
| | 5 | NO | NO | YES | YES-LTD. FNC'S |
| | 6 | YES | NO | YES | YES-LTD. FNC'S |
| | 7 | NO | YES | YES | YES-LTD. FNC'S |
| | 8 | YES | YES | YES | YES-LTD. FNC'S |

*Fig. 3*

SYSTEM AND METHOD FOR ENVIRONMENTAL MANAGEMENT OF A VEHICLE

BACKGROUND OF THE INVENTION

1. Field of the Invention

The present invention relates to a system and method for environmental management of a vehicle.

2. Background Art

Automatic climate control is increasingly prevalent in vehicles today. In some vehicles, a driver merely chooses a temperature setting, and a control system operates a climate control system to achieve the desired temperature. The climate control system may control the functions of a fan—e.g., on/off and fan speed—and an air conditioning system. Such a climate control system may also control the position and movement of various air dampers, or air flow doors, to control movement of air through an evaporator core or a heater core, the recirculation of air through the vehicle, the intake of fresh air, or some combination thereof.

Some automatic climate control systems monitor a temperature and humidity level of the vehicle cabin to determine if a defogging operation of the windshield is desirable. When it is determined that an automatic defogging operation is desired, the air conditioning system is typically operated to provide a supply of relatively dry air to the windshield to quickly effect the defogging operation. One limitation of such systems is that operation of the air conditioning compressor uses a relatively large amount of energy.

In the case of a conventional vehicle, where the compressor is mechanically driven by the engine, the increased load on the engine reduces efficiency and increases fuel consumption. In the case of a hybrid electric vehicle (HEV), operation of the compressor often necessitates starting the engine to ensure that the battery is not over-discharged. One of the benefits of an HEV is the fuel savings achieved by driving the vehicle using electric motor power, while maximizing the time the engine is shut down. Thus, automatic defog operations can offset some of the benefits gained by driving an HEV.

Another limitation of conventional automatic defogging systems is that passenger comfort may suffer as the climate control system is operated counter to the wishes of the vehicle occupants. Conversely, if the vehicle occupants are allowed to completely override the automatic defogging operation, the windshield may not clear as quickly as desired. Thus, a need exists for a system and method for vehicle climate control that strike a balance between meeting the comfort requirements of the vehicle occupants, and quickly and efficiently defogging a windshield to provide a clear view for the driver.

SUMMARY OF THE INVENTION

Embodiments of the present invention provide a system and method for environmental management of a vehicle that automatically operate a vehicle climate control system to quickly and efficiently defog a vehicle window, such as a vehicle windshield, while still operating at or near environmental comfort guidelines determined by a vehicle occupant. Embodiments of the invention provide a method for environmental management of a vehicle that includes a number of steps to balance the comfort requirements of the vehicle occupants with the goal of automatically defogging the vehicle windshield or other vehicle glass.

In one embodiment, the method includes determining certain environmental conditions for the vehicle, such as the temperature and humidity of the vehicle cabin. The temperature and humidity may be sensed at any location within the cabin effective to provide useful information for controlling the climate. For example, a capacitive humidity sensor may be placed near the windshield, an instrument panel, or other suitable location to determine the likelihood of the windshield becoming fogged. Certain combinations of temperature readings and humidity readings can be compared to a fog probability chart, such as commonly used in the art.

In one embodiment, the method may be executed by a control system for a heating, ventilating and air conditioning (HVAC) system. The HVAC control system may be configured with a preprogrammed algorithm to operate the HVAC to achieve the desired results. A number of sensors can provide inputs to the control system, and data related to fog probability may be stored in a controller, for example, in the form of a lookup table. The control system can also receive inputs from a number of manual overrides operable by an occupant of the vehicle. The preprogrammed algorithm is configured to act on the various inputs to operate the HVAC to strike an appropriate balance between occupant comfort and windshield defogging.

The HVAC control system operates to perform a number of functions, including controlling operation of: a fan system for generating an airflow, an air conditioning system for cooling the airflow, a recirculation system for controlling the amount of fresh and recirculated air introduced into the HVAC system, a mode system for controlling the direction of the airflow, and a heating system for heating the airflow. In many vehicles, the heating system will include a heater core, and heating the airflow is effected by diverting at least a portion of the airflow through the heater core. At least some of the functions are automatically controllable to effect automatic defogging of the windshield, and at least some of the automatically controllable functions are subject to manual overrides by a vehicle occupant.

Based on the inputs from the sensors, which indicate the relevant environmental conditions, it is determined whether it is desirable to defog the windshield. The status of the manual overrides is then determined, and the HVAC system is automatically controlled to effect defogging of the windshield when it is determined that none of the manual overrides have been selected.

In some embodiments of the present invention, if any of the manual overrides are selected, the automatic defog operation is ended or not allowed to run. This provides maximum control to the vehicle occupants. In other embodiments, the automatic defog operation is prohibited only when an air conditioning override or a recirculation override is selected. Thus, if a fan system override is selected, the automatic defog operation will be allowed to operate. In the latter instance, it may be desirable to limit the automatic control of the fan system such that only small speed adjustments are allowed. This allows the automatic defog system to effectively operate the fan outside the range selected by the vehicle occupant, but close enough to the occupant selection that the deviation is not noticeable.

In other embodiments of the present invention, a limited automatic defog operation is allowed regardless of the manual override chosen. For example, if a fan override is selected, automatic defog operation is allowed, but with limited air conditioning adjustments. Thus, the air conditioning system may be operated intermittently even when the occupant has requested that the air conditioning system be shut down. Conversely, if the fan override is not selected, but either of the air conditioning override or the recirculation override is selected, the automatic defog operation is allowed, but with limited operation of both the air conditioning system and the fan system. As explained below, other embodiments are contemplated within the scope of the present invention such that a balance is achieved between the environmental conditions desired by the vehicle occupants and the goal of automatically defogging the windshield.

BRIEF DESCRIPTION OF THE DRAWINGS

FIG. 2 is a block diagram illustrating a control system of the environmental management system shown in FIG. 1;

FIG. 3 is a chart illustrating embodiments of a method of the present invention; and FIG. 4 is a front plan view of a control head illustrated schematically in FIG. 2.

DETAILED DESCRIPTION OF THE EMBODIMENTS OF THE INVENTION

Figure 1:
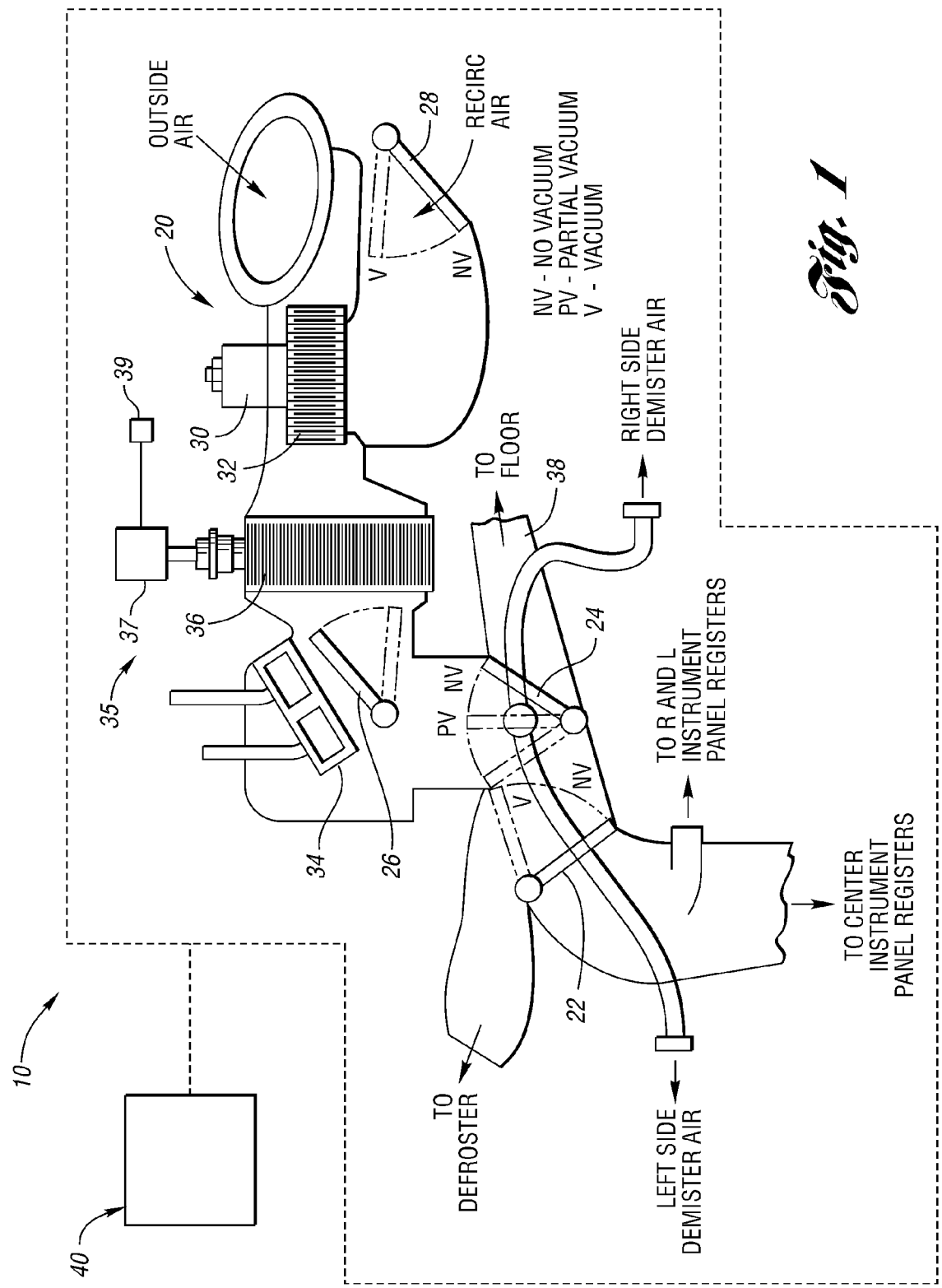
FIG. 1 is a schematic diagram illustrating a system for environmental management of a vehicle in accordance with an embodiment of the present invention.

In general, control of temperature and defogging of the windshield within an automobile is accomplished using various actuators to adjust the temperature and flow of air supplied to the cabin of the vehicle. FIG. 1 schematically shows a system 10 for environmental management of a vehicle in accordance with an embodiment of the present invention. The vehicle includes a heating, ventilating and air conditioning (HVAC) system, generally indicated at 20. The HVAC system 20 includes the arrangement of air flow doors, including panel-defrost, floor-panel, and outside recirculated air actuators or doors 22, 24, and 28, respectively.

The doors are part of an air distribution system for directing the flow of conditioned air to various locations within a passenger cabin in a vehicle, such as to the windshield, floor, or instrument panel as is commonly known. The doors 22, 24 and 28 may be driven by vacuum motors (not shown) between their various vacuum, partial vacuum and no vacuum positions in a conventional fashion as indicated in FIG. 1, or may be driven by an electric servo motor. A temperature control blend door 26 is also provided, and may be driven by an electric servo motor (not shown).

The HVAC system 20 also includes a variable speed fan system 30 including a blower wheel 32 for generating an airflow. The HVAC system 20 further includes a heating system, shown in FIG. 1 as a heater core 34, and an air conditioning system 35, including an evaporator core 36 and a compressor 37. The compressor 37 may be an electric compressor rather than one that is mechanically driven by an engine. This provides greater control of the operation of the HVAC 20, in that electric compressors can be configured for variable speed operation, unlike their mechanical counterparts whose speed is inextricably linked with the speed of the engine.

The heater core 34 and the evaporator core 36 respectively heat and cool the airflow generated by the fan system 30. The generated airflow is distributed through an airflow distribution system and associated ducting 38. The HVAC system 20 controls the temperature, the direction of the airflow, and the ratio of fresh air to recirculated air. The HVAC system 20 further includes a low pressure cycle switch 39 which communicates with the compressor 37. The low pressure switch 39 is operable to deactivate the compressor 37 under certain conditions. In addition, the compressor 37 can be deactivated when the evaporator core temperature drops below a predetermined value; this helps to prevent freezing of the evaporator core 36.

As described in more detail below, operation of the HVAC system 20 is controlled by a control system 40. FIG. 2 shows the control system 40, including an electronic controller 42. The controller 42 generates signals to control the HVAC system 20 according to a variety of inputs. For example, the controller 42 receives inputs from a passenger cabin temperature sensor 44, an ambient temperature sensor 46, an engine coolant temperature sensor 48, an evaporator temperature sensor 50, a humidity sensor 52, and a discharge air temperature sensor 54. The sensors 44-54 respectively provide signals that are representative of interior cabin temperature, ambient (outside) air temperature, evaporator temperature, engine coolant temperature (ECT), relative humidity of the passenger cabin, and discharge air temperature—i.e., the temperature of the air being discharged from the HVAC system 20 into the vehicle cabin.

In addition to receiving inputs from the sensors 44-54, the controller 42 may also receive inputs from a vehicle occupant via an input device 56. The input device 56 may be a control head as commonly used in vehicle instrument panels and illustrated in FIG. 4. As explained more fully below, the input device 56 allows a vehicle occupant to manually control the HVAC functions, and in some cases, override an automatic operation of the HVAC system 20. The controller 42 controls operation of the compressor 37, as well as the doors 22-28 to regulate the temperature and flow of air, and ultimately to maintain the comfort of driver and passengers in the vehicle. In addition, the controller 42 is programmed with an algorithm to effect automatic defogging of the vehicle windshield.

Turning to FIG. 3, a chart 58 illustrates a number of embodiments of the present invention. For this description, the HVAC system 20 and its control system 40, shown in FIGS. 1 and 2, will be used for reference. In each of Options 1-5 illustrated in FIG. 3, the method examines manual overrides of certain HVAC functions. In particular, three manual overrides are used. They are the manual overrides of: the fan system 30, the air conditioning system 35, and the recirculation system—i.e., the recirculation door 28. These manual overrides can be selected by actuating one or more of the selector switches shown in FIG. 4.

FIG. 4 illustrates in detail the control head 56, schematically shown in FIG. 2. The control head 56 acts as an input device for the vehicle occupants, allowing manual selection of various climate control functions. A mode selector switch 60 allows an occupant to choose where airflow will be directed. A temperature selector switch 62 provides air temperature control, and a fan selector switch 64 provides on-off and fan speed control. The recirculation switch 66 allows for full recirculation of cabin air, all fresh air, or some combination thereof. The A/C switch 68 allows an occupant to manually select air conditioning. The control head 56 is just one example of a control head that can be used with the present invention. Other control heads, including other analog or digital control heads may also be used.

Embodiments of the present invention can automatically control any of the five climate control options that are manually controllable as shown in FIG. 4—i.e., mode, temperature, fan, recirculation, and air conditioning. It is contemplated that each of the options 1-5 illustrated in FIG. 3 are mutually exclusive. That is, a control system, such as the control system 40 shown in FIG. 2, will be configured to operate an automatic defog operation in accordance with only one of the five options at any one time. The decision as to which option to use may be made by vehicle manufacturers based on considerations such as, for example, how much climate control to allocate to the vehicle occupants, how much automatic climate control to allow, when to allow automatic climate control, and what level of functionality of automatic climate control should be allowed.

Although the five options illustrated in FIG. 3 have some differences in implementation, there are similarities as well. For example, in each of the Options 1-5 illustrated in FIG. 3, the automatic defog operation ("Auto Defog Actions") is run if none of the three manual overrides is selected. The first option, which has seven states, can be succinctly summarized as two states, since six of the seven states are the same. In sum, if any of the three manual overrides are chosen in Option 1, then the automatic defog operation is ended or not run—i.e., it is prohibited. Conversely, in Option 2, there are four states, although the first state is common to Option 1 and the other three options. In Option 2, if either the air conditioning override or the recirculation override is chosen, the automatic defog operation is ended or not run. If the fan system override is selected, however, the automatic defog operation is allowed to run.

Although the automatic defog operation is operable in State 4, it is run in a limited mode—i.e., only small and incremental adjustments of the fan operation are allowed. For example, if the fan system 30 is being supplied with a 4 volt potential, it may be automatically increased to 5 volts to increase its speed, while still operating near the occupant selected level. As discussed above, such limited operation of the HVAC system components helps to make the automatic defog operation transparent to the vehicle occupants. In addition to the functions shown in the chart 58, automatic operation of the mode and temperature functions are allowed in States 1, 2, and 4.

In Option 3, a limited function of the automatic defog operation is allowed regardless of which of the three overrides is selected by the vehicle occupant. Automatic operation of mode and temperature functions are allowed in all eight states, but states 3, 5, and 7 limit some of the automatic functions. For example, just as in state 4 of Option 2, each of states 3, 5, and 7 in Option 3 allow only limited automatic control of the fan system 30. In addition, in states 2-8, automatic operation of the air conditioning system 35 is limited. This may include intermittent and/or short term use of the compressor 37 even if the manual A/C switch 70—see FIG. 4—is in the "off" position. It is worth noting here that automatic control of the air conditioning system 35 is further limited by ambient temperature. For example, a predetermined temperature such as 30° F. may be chosen as a minimum temperature below which the compressor 37 will not be allowed to operate.

If the fan override is selected in Option 3, the automatic defog operation is allowed to run, but with limited operation of the air conditioning system 35. This may involve intermittent operation of the compressor 37, or varying its speed. If, in Option 3, the fan override is not selected, but either of the air conditioning override or the recirculation override is selected, the automatic defog operation is allowed with limited operation of both the fan system 30 and the air conditioning system 35.

As with the first three options, Option 4 allows full automatic defog operation when none of the three manual overrides are selected. Conversely, Option 4 gives precedence to a manual override of the recirculation function, prohibiting the automatic defog operation if the recirculation override is chosen—regardless of the other two manual override selections. In Option 4, automatic operation of mode and temperature functions are only allowed in States 1-4.

In states 2-4, either or both of the fan override and the air conditioning override are selected, but not the recirculation override. In these three states, the automatic defog operation is allowed to run, but with limited operation of fan system 30, the air conditioning system 35, and the recirculation door 28. The limitations on automatic operation of the fan system 30 and air conditioning system 35 may be as described above, while limiting the automatic operation of recirculation may include limiting the automatic control to only slight changes in the recirculation setting.

Option 5 provides full functionality of the automatic defog operation in the first four states—i.e., as long as the recirculation override is not selected, all automatic operations of the HVAC system 20 are allowed. If, however, the manual recirculation override is selected, the automatic defog operation is still allowed to operate, but only in a limited manner, as in states 2-4 in Option 4. Also, similar to Option 3, automatic operation of mode and temperature functions is allowed in all states. It is worth noting that other embodiments of the present invention may use different combinations of automatic and manual climate control operation to achieve the desired result of balancing vehicle occupant comfort with automatic, efficient implementation of a windshield defogging operation.

While the best mode for carrying out the invention has been described in detail, those familiar with the art to which this invention relates will recognize various alternative designs and embodiments for practicing the invention as defined by the following claims.

What is claimed:

1. A method for environmental management of a vehicle having a window, and a heating, ventilating and air conditioning (HVAC) system including an HVAC control system operable to perform a plurality of functions, including controlling operation of: a fan system for generating an airflow, an air conditioning system for cooling the airflow, a recirculation system for controlling the amount of fresh and recirculated air introduced into the HVAC system, a mode system for controlling the direction of the airflow, and a heating system for heating the airflow, at least some of the functions being automatically controllable to effect defogging of the window, at least some of the automatically controllable functions being subject to manual overrides by a vehicle occupant, the method comprising:
   determining certain environmental conditions for the vehicle;
   determining when it is desirable to defog the window based on the determined environmental conditions;
   determining a status of the manual overrides; and
   implementing at least some of the automatically controllable functions of the HVAC system to effect defogging of the window when it is determined that none of the manual overrides has been selected.

2. The method of claim 1, further comprising prohibiting implementation of the automatically controllable functions of the HVAC system to effect defogging of the window when it is determined that any of the manual overrides are selected.

3. The method of claim 1, further comprising implementing at least some of the automatically controllable functions of the HVAC system to effect defogging of the window when it is determined that at least one of a manual override for the air conditioning system or a manual override for the recirculation system is being manually controlled.

4. The method of claim 3, further comprising implementing at least some of the automatically controllable functions of the HVAC system to effect defogging of the window when it is determined that a manual override for the fan system is selected, and it is determined that neither the manual override for the air conditioning system nor the manual override for the recirculation system is selected.

5. The method of claim 4, wherein implementing at least some of the automatically controllable functions of the HVAC system to effect defogging of the window includes limited automatic control of the fan system to maintain operation of the fan system near a manual override selection for the fan system.

6. The method of claim 1, further comprising implementing at least some of the automatically controllable functions of the HVAC system to effect defogging of the window with limited automatic control of the air conditioning system when it is determined that the fan system is being manually controlled.

7. The method of claim 1, further comprising implementing at least some of the automatically controllable functions of the HVAC system to effect defogging of the window when it is determined that a manual override for the fan system is not selected and at least one of a manual override for the air conditioning system or a manual override for the recirculation system is selected.

8. The method of claim 7, wherein implementing at least some of the automatically controllable functions of the HVAC system to effect defogging of the window includes limited automatic control of the air conditioning system and the fan system when it is determined that the manual override for the fan system is selected and at least one of the manual overrides for the air conditioning system or the recirculation system is selected.

9. The method of claim 1, further comprising implementing at least some of the automatically controllable functions of the HVAC system to effect defogging of the window when it is determined that a manual override for the recirculation system is selected and at least one of a manual override for the fan system or a manual override for the air conditioning system is selected.

10. The method of claim 9, further comprising implementing at least some of the automatically controllable functions of the HVAC system to effect defogging of the window with limited automatic control of the air conditioning system, the recirculation system, and the fan system when it is determined that the manual override for the recirculation system is selected.

11. The method of claim 1, wherein implementing at least some of the automatically controllable functions of the HVAC system to effect defogging of the window includes limited automatic control of the air conditioning system, the recirculation system, and the fan system when it is determined that the manual override for the recirculation system is not selected and at least one of the manual overrides for the fan system or the air conditioning system is selected.

12. The method of claim 1, further comprising prohibiting implementation of the automatically controllable functions of the HVAC system to effect defogging of the window when it is determined that the manual override for the recirculation system is selected.

13. A method for environmental management of a vehicle having a windshield, a plurality of sensors for respectively sensing certain environmental condition of the vehicle, and a heating, ventilating and air conditioning (HVAC) system including an HVAC control system operable to perform a plurality of functions, including controlling operation of: a fan system for generating an airflow, an air conditioning system for cooling the airflow, a recirculation system for controlling the amount of fresh and recirculated air introduced into the HVAC system, a mode system for controlling the direction of the airflow, and a heating system for heating the airflow, at least some of the functions being manually controllable by a vehicle occupant, and at least some of the functions being automatically controllable based on a preprogrammed algorithm using inputs from the sensors, the preprogrammed algorithm being configured to effect defogging of the windshield, the method comprising:
    determining at least some of the certain environmental conditions for the vehicle;
    determining when it is desirable to defog the windshield based on the determined environmental conditions;
    determining a status of the manually controllable functions of the HVAC system; and
    automatically controlling at least some of the automatically controllable functions of the HVAC system according to the preprogrammed algorithm when it is determined that none of the functions are being manually controlled, thereby effecting automatic defogging of the windshield.

14. The method of claim 13, further comprising prohibiting automatic control of the at least some automatically controllable functions of the HVAC system according to the preprogrammed algorithm when it is determined that any of the functions are being manually controlled.

15. The method of claim 13, further comprising prohibiting automatic control of the at least some automatically controllable functions of the HVAC system according to the preprogrammed algorithm when it is determined that at least one of the air conditioning system or the recirculation system is being manually controlled.

16. The method of claim 13, further comprising automatically controlling the at least some automatically controllable functions of the HVAC system according to the preprogrammed algorithm when it is determined that the fan system is being manually controlled, and it is determined that neither the air conditioning system nor the recirculation system is being manually controlled.

17. The method of claim 16, wherein the automatic control of the at least some automatically controllable functions of the HVAC system includes limited automatic control of the fan system to maintain operation of the fan system near a level of operation manually chosen by the vehicle occupant when it is determined that the fan system is being manually controlled, and it is determined that neither the air conditioning system nor the recirculation system is being manually controlled.

18. The method of claim 13, further comprising automatically controlling the at least some automatically controllable functions of the HVAC system according to the preprogrammed algorithm with limited automatic control of the air conditioning system when it is determined that the fan system is being manually controlled.

19. The method of claim 13, further comprising automatically controlling the at least some automatically controllable functions of the HVAC system according to the preprogrammed algorithm when it is determined that the fan system is not being manually controlled and at least one of the air conditioning system or the recirculation system is being manually controlled.

20. The method of claim 19, wherein the automatic control of the at least some automatically controllable functions of the HVAC system includes limited automatic control of the air conditioning system and the fan system when it is determined that the fan system is not being manually controlled and at least one of the air conditioning system or the recirculation system is being manually controlled.

21. The method of claim 13, further comprising automatically controlling the at least some automatically controllable functions of the HVAC system according to the preprogrammed algorithm when it is determined that the recirculation system is not being manually controlled and at least one of the fan system or the air conditioning system is being manually controlled.

22. The method of claim 21, wherein the automatic control of the at least some automatically controllable functions of the HVAC system includes limited automatic control of the air conditioning system, the recirculation system, and the fan system when it is determined that the recirculation system is not being manually controlled and at least one of the fan system or the air conditioning system is being manually controlled.

23. The method of claim 21, further comprising prohibiting automatic control of the at least some automatically controllable functions of the HVAC system according to the preprogrammed algorithm when it is determined that the recirculation system is being manually controlled.

24. The method of claim 21, further comprising automatically controlling the at least some automatically controllable functions of the HVAC system according to the preprogrammed algorithm with limited automatic control of the air conditioning system, the recirculation system, and the fan system when it is determined that the recirculation system is being manually controlled.

\* \* \* \* \*